Figure 1:
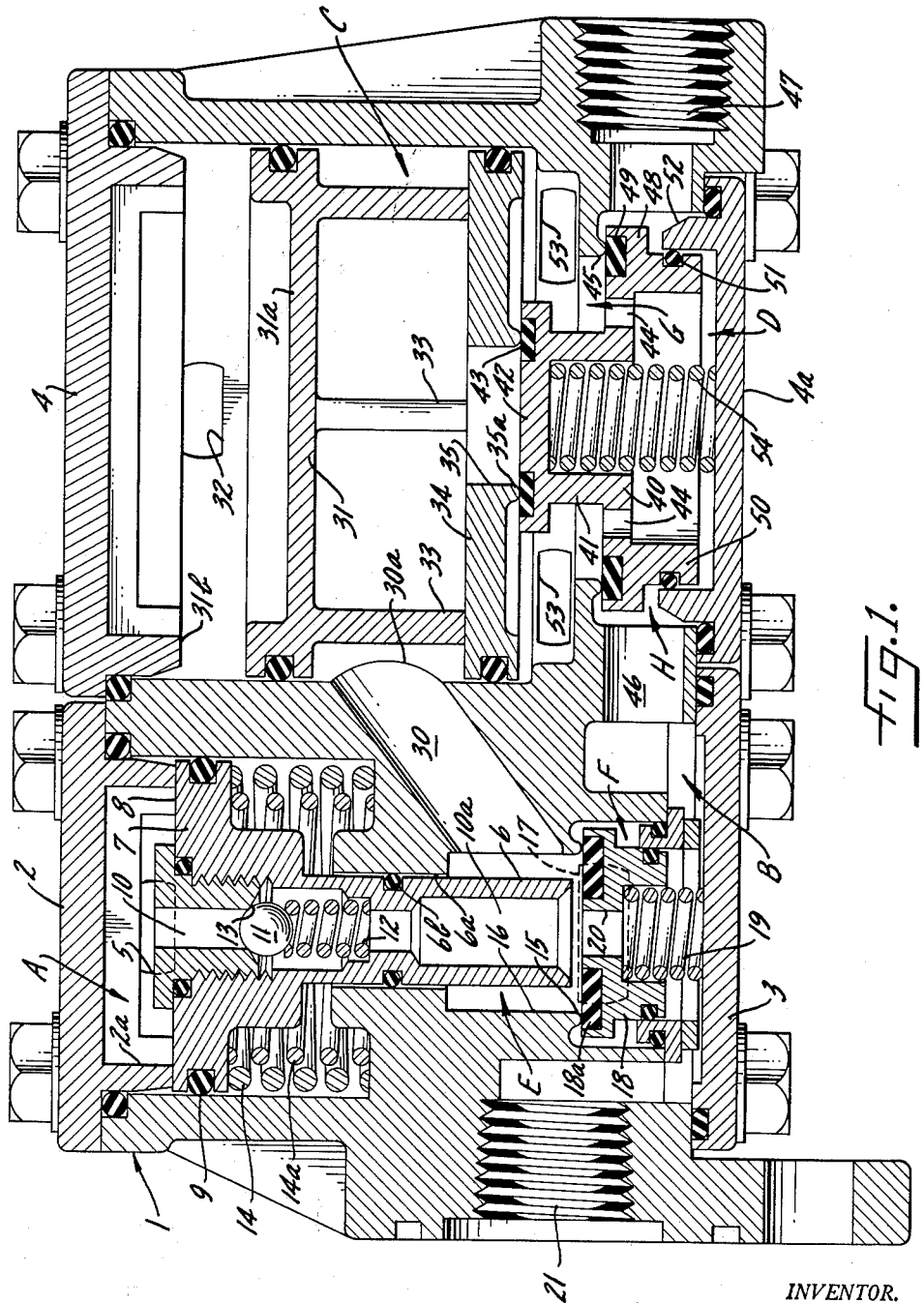
Figure 2:
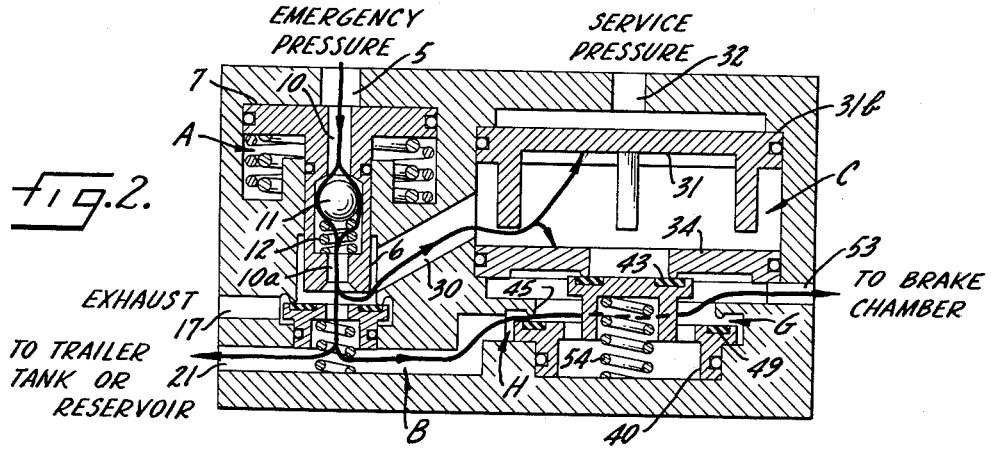

July 9, 1963

H. L. DOBRIKIN 3,097,021

RELAY EMERGENCY VALVE

Filed Jan. 23, 1961

3 Sheets-Sheet 1

INVENTOR.
Harold L. Dobrikin,
BY Parker & Carter
Attorneys.

July 9, 1963

H. L. DOBRIKIN 3,097,021

RELAY EMERGENCY VALVE

Filed Jan. 23, 1961

3 Sheets-Sheet 2

INVENTOR.
Harold L. Dobrikin,
BY Parker & Carter
Attorneys.

July 9, 1963  H. L. DOBRIKIN  3,097,021
RELAY EMERGENCY VALVE
Filed Jan. 23, 1961  3 Sheets-Sheet 3
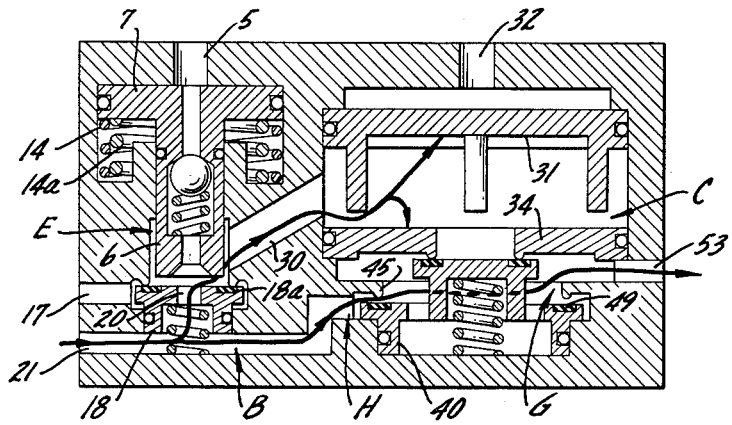
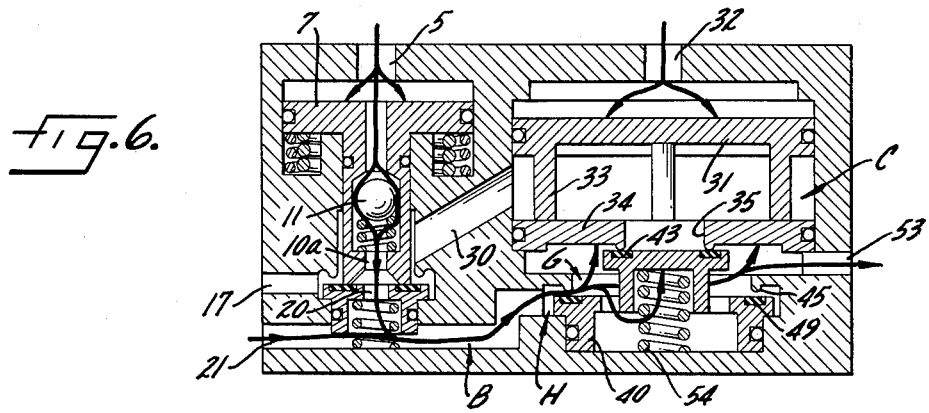
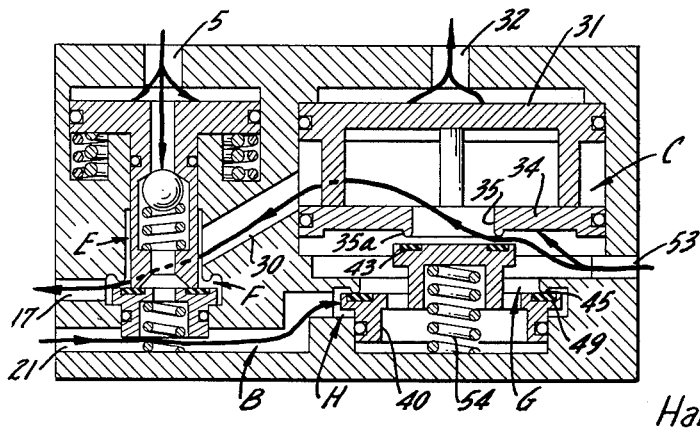
INVENTOR.
Harold L. Dobrikin,
BY Parker & Carter
Attorneys.

United States Patent Office 3,097,021
Patented July 9, 1963

3,097,021
RELAY EMERGENCY VALVE
Harold L. Dobrikin, Highland Park, Ill., assignor to Berg Airlectro Products Company, Chicago, Ill., a corporation of Illinois
Filed Jan. 23, 1961, Ser. No. 84,239
12 Claims. (Cl. 303—29)

This invention relates to valves and has for one purpose the provision of an emergency relay valve useful in the air pressure system of a vehicle such as a trailer-tractor combination and the like.

Another purpose is to provide an emergency relay valve effective to cause automatic actuation of a vehicle brake system in response to the loss of pressure in the air pressure system of the vehicle.

Another purpose is to provide an emergency relay valve effective to cause automatic actuation of the air pressure brake system of a vehicle in response to loss of pressure in the emergency air system of said vehicle.

Another purpose is to provide an emergency relay valve assembly effective to apply the brakes of a vehicle in automatic response to the loss of pressure in either the main or emergency air pressure system of said vehicle.

Another purpose is to provide a valve assembly including normal brake-applying means and emergency brake-applying means.

Another purpose is to provide a brake application valve responsive to normal application, to loss or diminution of the air pressure in the normal air pressure system of a vehicle, and to the loss or diminution of the emergency air pressure of a vehicle.

Another purpose is to provide a combined emergency and relay fluid pressure control valve.

Another purpose is to provide an emergency relay fluid pressure valve having means for preventing pressure bleed back therefrom.

Another purpose is to provide a relay valve of highly sensitive response and rapid application.

Another purpose is to provide an emergency valve and a relay valve having operable elements thereof in cartridge configuration.

Another purpose is to provide an emergency relay valve of positive, rapid response and accelerated recovery and charging time.

Another purpose is to provide an emergency relay valve effective to maintain the brakes of a vehicle in applied position until a predetermined pressure is present in the system of which such valve is a part.

Another purpose is to provide a valve having both emergency and normal service elements independently operable within a single housing.

Another purpose is to provide a valve effective to maintain brake chamber pressure of a vehicle from a vehicle tank reservoir and, in emergency, to maintain said pressure from the constant air source of such vehicle.

Another purpose is to provide a valve assembly containing in a single housing of minimum weight and size elements effective to accomplish all of the foregoing purposes.

Other purposes will appear from time to time during the course of the specification and claims.

The invention is illustrated more or less diagrammatically in the accompanying drawings, wherein:

FIGURE 1 is a side elevation in partial cross section illustrating the invention with the parts in normal or uncharged position; and FIGURES 2–7 inclusive are schematic illustrations of the structure illustrated in FIGURE 1 with the parts thereof in various operational positions.

Like parts are indicated by like numerals throughout the specification and drawings.

Referring now to the drawings, and particularly to FIGURE 1, the numeral 1 generally indicates a housing. The housing 1 has a plurality of outwardly open wells or chambers A, B, C, and D therein, respectively, closed by suitable cap-like elements or closure plates, such as those illustrated at 2, 3, 4 and 4a, the latter being secured to housing 1 by any suitable means such as the fasteners illustrated. It will be observed that members 2, 3, 4 and 4a are of a diameter equal to or greater than that of the respective chamber with which each is associated.

A fluid pressure inlet passage 5 communicates with an upper portion of chamber A for reception in chamber A of fluid pressure from a supply source thereof, such as an air supply system of a truck-trailer vehicle, for example. Piston 7 is reciprocal within chamber A with its major planar upper surface 8 presented to the passage 5 for actuation by fluid pressure entering through passage 5. Seal means 9 is carried by piston 7 in contact with the walls of chamber A. An integral central tubular extension 6 depends coaxially from piston 7 through a cylindrical bore 6a and into a chamber E. Seal means 6b is carried by extension 6 in contact with the wall of bore 6a. A longitudinal passage 10 extends axially throughout piston 7 and extension 6. Check valve element 11 is urged by spring 12 toward a seat 13 to seal passage 10 against bleed back of pressure through passage 10 into the area of chamber A above piston 7 while permitting flow of pressure in the opposite direction when said pressure reaches a predetermined level sufficient to overcome spring 12. Springs 14, 14a are positioned in chamber A to urge piston 7 toward inlet 5. The cap 2 has an inward extension 2a serving as a limit stop to upward movement of piston 7 in response to the action of springs 14, 14a.

Chamber E has a valve seat 15 defining a communicating bore 16 leading to chamber F with which an exhaust outlet passage 17 (shown in dotted lines) communicates. The bore 16 can be closed by piston valve member 18 reciprocal in chamber F and carrying a compressible annulus 18a urged toward seat 15 by spring 19, the opposite end of which engages the inner surface of closure 3. An axial passage 20 is formed through piston 18 in alignment with passage 10 and communicates with chamber B. Annulus 18a is of sufficient width to provide a seat for the downwardly open end of tubular extension 6 of piston 7. An outlet passage 21 communicates with chamber B and means for directly fluid pressure to a trailer air tank, for example.

A transfer passage 30 communicates at one of its ends with chamber E and at its opposite end with chamber C. Reciprocal in chamber C is a piston 31 mounted for movement in chamber A above the outlet 30a of transfer passage 30 and between said outlet and a fluid pressure inlet 32 communicating with chamber A from a point outside the housing 1 and adapted to deliver fluid pressure from a source of constant fluid pressure to the upper surface 31a of piston 31. The piston 31 has depending therefrom a plurality of circumferentially spaced support or leg portions 33 positioned to seat upon an annular portion of a second piston 34 mounted for reciprocation in chamber C below exhaust outlet 30a or on the opposite side thereof from piston 31. An axial bore or passage 35 is formed in piston 34 for communication with the area of chamber C between pistons 31 and 34. A valve seat 35a is formed at and defines the downwardly open end of bore 35.

Mounted for reciprocation in chamber D is a valve piston 40. The piston 40 has an upwardly extending central portion 41 carrying a valve plate portion 42 which in turn supports a compressible annulus 43 for seating engagement with the seat 35a. A plurality of apertures 44 are circumferentially spaced about the lower end of extension 41. The apertures 44 communicate at their upper ends with a chamber G and at their opposite ends with the chamber D. A valve seat 45 is positioned at and defines a lower outlet for chamber G into an annular chamber H. A transfer passage 46 places chambers B and H in communication one with the other. An alternate outlet passage 47 is formed in housing 1 for direction of fluid pressure to a trailer tank, for example, the passage 47 communicating with the chamber H.

Piston 40 carries a flange portion 48 which in turn supports a compressible annulus 49 for seating engagement with the seat 45. A circumferential portion 50 of piston 40 is reciprocal within and carries sealing means 51 in contact with the inner walls of a sleeve 52 extending inwardly from and formed with cap 4a.

Indicated at 53 are outlet passages positioned to deliver fluid pressure from chamber G to the brake chambers for operation of the brakes of a vehicle, for example. A spring 54 has its opposite ends in engagement with the inner surface of cap 4a and an undersurface of piston portion 42 to urge the valve sealing elements 43, 49 against their respective valve seats 35a, 45.

It will be understood that the right-hand portion may, for convenience, be described as the "service section" of the valve assembly of the invention, as distinct from the left-hand portion which may be described as the "emergency section" of the device of the invention. The service section may be employed separately as a relay valve. In such event, the transfer passage 30 becomes an exhaust outlet; the inlet from chamber B to chamber H continues to function as an inlet for brake-operating pressure and outlets 53 continue to function as delivery parts for the direction of operating pressure to the brake-chambers of a vehicle for example. The remaining elements in the service section function as above described to deliver pressure to brake-operating chambers upon entry of fluid pressure at the service inlet 32 and to exhaust said chambers through bore 35.

The use and operation of the invention are as follows:

The use and operation of the invention may be best understood from a review of the more or less diagrammatic illustrations herein to which lines and arrows indicating the path of fluid pressure through the valve and valves of the invention have been added. Calling attention, for example, to FIGURE 2, it will be observed that emergency pressure has been delivered to the area of chamber A above piston 7 through inlet 5. This emergency pressure, however, is still at a level less than a predetermined amount. For convenience in description, we may select an amount of 55 pounds per square inch as suitable. Pressure entering inlet 5 and remaining below 55 p.s.i. will be passed through the valve of the invention to charge, for example, the trailer air system of a tractor-trailer vehicle. The fluid under pressure entering through inlet 5 passes through channel or passage 10, around the ball check valve 11 against the action of spring 12, and downwardly through the remaining portion 10a of passage 10 below check valve 11. The fluid under pressure then passes outwardly of tubular extension 6 beneath the lip of the downward open end thereof, and into chamber C between pistons 31 and 34. The pressure entering chamber C raises piston 31 against the stop 31b formed by an inward cylindrical extension of cap 4 and also forces piston 34 downwardly against the seat 43 on piston 40 which in turn forces piston 40 downwardly against the action of spring 54 to unseat the valve element 49 from its seat 45, and thus to open a passage from chamber B through chamber H into chamber G from whence fluid pressure may leave the valve housing through outlet 53 for delivery to the brake chambers of the vehicle. The latter pressure constitutes the remaining amount of fluid pressure passing through passage 10a, thence through passage 20 in piston 18 and into chamber B. As indicated, a portion of the pressure in chamber B is enabled to proceed through chambers H and G and to the brake chambers of the vehicle, a remaining portion passes from chamber B through outlet passage 21 for delivery to the reservoir or trailer tank for charging thereof. Thus the emergency pressure entering through inlet 5 is employed to charge the entire trailer system. A portion of said entering emergency pressure is employed to open the air valve formed by piston 40 to allow another portion of said entering pressure to pass for delivery to the brake chambers to set the brakes while the charging operation is in progress.

Figure 3:
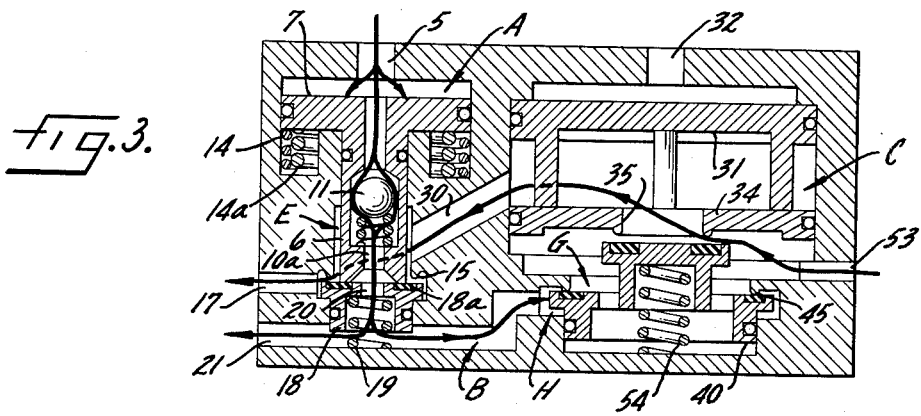

Referring now to FIGURE 3, the parts are illustrated in the position assumed when the tank air of a vehicle air pressure system has reached an adequate level. It will be observed that delivery of emergency pressure below a predetermined level, such as the 55 p.s.i. selected, causes delivery of air pressure to the brake chamber, thus applying the brakes and preventing movement of the vehicle while the system is being charged and while the emergency air pressure is below said predetermined level. When the emergency pressure has passed beyond the selected predetermined level, said pressure entering inlet 5 is effective against the upper surface of piston 7 to move said emergency piston against the action of springs 14, 14a, and to bring the lower end of extension 6 into sealing engagement with compressible annulus 18a. Continued downward movement of piston 7 and extension 6 causes piston 18 to move against the action of spring 19 and to unseat the annulus 18a from its seat 15. When this happens, the transfer passage 30 and chambers E and C are placed in communication with the exhaust outlet 17, thus exhausting the pressure in chamber C below piston 31 to atmosphere. When the exhaust valve piston 18 is unseated from its seat 15, and fluid pressure is absent in chamber A, the spring 54 is effective to return the brake chamber control piston 40 to its earlier position and to close the passage defined by seat 45 between chambers H and G. Pressure in the brake chambers, however, is now free to act against the underside of piston 34, to raise it from its seat, and to pass through bore 35, chamber C, passage 30 and chamber E to the exhaust 17. Thus, the brake chambers are vented to atmosphere and movement of the vehicle is permitted, the pressure now having reached a predetermined safe level. As the brake chambers are being vented to atmosphere, the emergency fluid pressure entering at inlet 5 continues to pass downwardly about check valve 11, through passages 10a and 20 into chamber B. The pressure entering chamber B is unable to pass from chamber H into chamber G, but continues to be free to move from chamber B through outlet passage 21 for direction to the trailer reservoir or tank.

Figure 4:
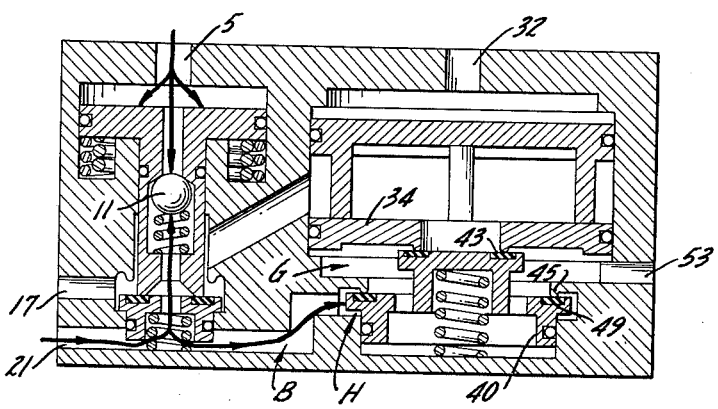

Referring now to FIGURE 4, the parts are illustrated in the position assumed when the emergency pressure entering inlet 5 is below the trailer tank pressure. When this happens, the ball check 11 closes, thus preventing any air feedback from the trailer tank into the emergency or supply line, the brake chambers have been emptied of pressure, and piston 34 is seated upon the valve annulus 43 carried by piston 40. The trailer tank pressure is present in chambers B and H and is held against entry into chamber G for direction to the brake chambers by the seating of annulus 49 carried by piston 40 on the opposed seat 45. Thus, the valves of the invention are in the position assumed when the system is in fully charged condition.

Referring now to FIGURE 5, I illustrate the configuration of the invention upon the loss or diminution of emergency pressure below a predetermined level. If, for any reason, the emergency pressure in the system falls below a predetermined level, say, for example, 40 p.s.i., the forces on the emergency piston 7 are insufficient to hold the piston 7 against the force of springs 14, 14a, and the piston 7 is moved upward in response to said spring forces, thus permitting the piston 18 to close the exhaust port 17. Upward movement of piston 7 and its integral extension 6 also unseats the lower end of the extension 6 from the valve annulus 18a carried by piston 18, and thus places the service cavity or chamber C in communication, through passage 20, chamber E, and transfer passage 30 with chamber B and thus with the trailer tank pressure to deliver fluid pressure from the trailer tank to chamber C. The pressure entering chamber C from transfer passage passage 30 is effective to raise piston 31 and to lower piston 34 against piston 40, and thus to unseat the annulus 49 carried by the piston 40 from the seat 45, thus placing chamber H in communication with chamber G and with the outlets 53 for delivering fluid pressure to the brake chambers of the vehicle. Since chamber H is in perpetual communication with chamber B, which in turn is in communication with the trailer tank pressure, it will be realized that the reduction or diminution of emergency pressure in the system below a level predetermined to permit the rise of piston 7 is effective to deliver fluid pressure from the trailer tank to chamber C, and thus to cause an unseating of the pressure application valve piston 40 to permit the immediate delivery of some of said trailer tank pressure to the brake chambers of the vehicle and thus to apply the brakes thereof in immediate, automatic response to said diminution of emergency pressure.

Referring now to FIGURE 6, the valves of the invention are illustrated in the position assumed when the brakes of the vehicle are operated through the application of normal service pressure. In such normal situation, emergency fluid pressure above the predetermined level, for example, above 55 p.s.i., is effective to retain the piston 7 in lowered position, and to pass about the ball check valve 11. Chamber B is thus in communication through passages 10a and 20 with the emergency pressure entering through inlet 5 and through passage 21 with the tank pressure of the vehicle. Upon application of service pressure entering through inlet 32, the piston 31 is caused to move downwardly, as the parts are shown in the drawings, and, through the mediacy of circumferentially spaced legs 33, to move the piston 34 and the pressure application valve piston 40, with which piston 34 is in contact, downwardly against the action of spring 54 to unseat the valve annulus 49 from its valve seat 45, and thus to place chamber B in communication, through chamber H, with chamber G, and thus with the outlets 53 for delivery of fluid pressure from chamber B to the brake chambers of the vehicle to apply said brakes. The movement of upper service piston 31 and lower service piston 34 downwardly against application valve piston 40 maintains the exhaust passage 35 in engagement with the valve annulus 43 carried by piston 40 to preclude exhaust of fluid pressure from chamber G or from the brake chambers in communication therewith back through chamber C, passage 30, and exhaust outlet 17. Fluid under pressure from either the trailer tank or the emergency supply, both of which are in communication with chamber B, is allowed to pass through the pressure application valve 40 into the brake chambers. As this occurs, the pressure in chamber C beneath lower service piston 34 builds up at a rate corresponding to the pressure in the brake chambers. When the pressure beneath the lower service piston 34 is equal to or in balance with the service pressure acting on top of the upper service piston 31, the service pistons 31, 34 will rise, in reaction to the additional force of spring 54, thus closing the pressure application valve 40. At this point, the pressure in the brake chambers will be equal to the service or application pressure delivered at inlet 32.

As indicated by the lines and arrows in FIGURE 6, the pressure from chamber B is delivered to the underside of piston 34, to the brake chambers, and through passages 44 to the underside of application valve piston 40 so that the difference created by spring 54 shall be effective and holding of piston 40 in open position is precluded.

Referring now to FIGURE 7, the parts are illustrated in the position assumed thereby in response to release of service pressure above service piston 31 to release the brakes of the vehicle. Upon removal of service pressure from above service piston 31, the pressure of the brake chambers acting back through passages 53 against the undersurface of lower service piston 34 causes piston 34 to rise, thus opening the exhaust valve formed by seat 35a and annulus 43 and allowing the pressure of spring 54 to close the pressure application valve 40, thus sealing, through seating of annulus 49 upon its seat 45, against the entry into chamber G or C of tank pressure from chambers B and H. With the exhaust bore 35 open to the brake chambers, pressure leaves the brake chambers and passes through the bore 35 into chamber C from whence it passes through transfer passage 30 and chambers E and F to exhaust outlet 17. Thus, the brake chambers are vented to atmosphere and the brakes are released.

It will be observed that FIGURES 2 through 7, inclusive, are not identical to FIGURE 1 in all details. FIGURE 1 illustrates the device in manufacture. FIGURES 2 through 7 are presented for ease in describing the operation of the invention. Thus, the housing 1 is shown as a mere block, exhaust 17 is indicated as paralleling passage 21 and inlets 5 and 32 are illustrated as entering through the top of housing 1 while the brake chamber outlets 53 are indicated as a single outlet in a side wall of housing 1 extending oppositely from the exhaust outlet 17. With these exceptions, and the elimination of minor details within the housing 1, it will be observed that the basic elements are all illustrated and that they correspond substantially to the elements illustrated in FIGURE 1.

Whereas I have described and claimed a preferred embodiment of the invention, it will be understood that further modifications will suggest themselves to those skilled in the art upon a reading of the foregoing specification. Accordingly, the foregoing description should be taken as merely illustrative and not definitive, and the scope of the invention should be limited only by the following appended claims.

I claim:

1. A fluid pressure relay valve comprising a housing, a first chamber in said housing, a fluid pressure inlet in said housing communicating with said chamber, a first piston reciprocal in said chamber and having a surface opposed to said inlet, a bore in said housing communicating with said chamber, an extension on the opposite surface of said piston and slidable in said base, a first passage through said piston and extension, a second chamber in said housing, a second piston reciprocal in said second chamber and having a surface positioned for contact by said extension, an axial passage in said second piston in communication with said passage in said extension, a valve passage between said bore and said second chamber, and positioned to be closed by said second piston, an exhaust outlet in said housing communicating with said second chamber, a third chamber in said housing in communication with said axial passage, a pressure outlet in communication with said third chamber, means yieldingly urging said extension away from said second piston and yieldingly urging said second piston toward position closing said valve passage, said second piston being yieldingly urged simultaneously toward position closing said valve passage and toward said extension, said extension being positioned, in response to entry of fluid pressure below a predetermined level through said inlet, to deliver said fluid pressure through said first passage and said axial passage to said third chamber, said extension being movable through said valve passage and against said second piston in response to entry of fluid pressure above said level through said inlet to deliver fluid pressure through said first passage and said axial passage to said third chamber and to urge said second piston toward valve passage opening position to place said valve passage in communication with said exhaust outlet through said second chamber.

2. In an emergency relay valve a housing, an emergency fluid pressure inlet in said housing, an emergency chamber communicating with said inlet, a piston reciprocal in said chamber and presenting a surface to said inlet, an extension on the opposite surface of said piston, a passage extending through said piston and extension and communicating with said inlet at one of its ends and with an open opposite end of said extension, a check valve in said passage positioned to permit passage of fluid pressure from said inlet to said extension outlet and to prevent passage of fluid pressure in the opposite direction, an exhaust outlet in said housing, a piston valve yieldingly urged into exhaust outlet closing position, said piston valve being positioned for actuation toward open position by said piston extension, a flexible seal means carried by said piston valve and positioned for contact by said piston extension, a passage in said piston valve positioned for communication with said extension passage when said open end of said extension is seated upon said piston valve seal means, said piston passage communicating with a pressure chamber, a pressure outlet in said housing, a valve passage between said pressure chamber and said pressure outlet, a second piston valve yieldingly urged toward position closing said valve passage, an application chamber in said housing, an application piston assembly reciprocal in said housing, an application pressure inlet in said housing communicating with said application chamber on one side of said application piston assembly, said piston assembly being movable into actuating contact with said second piston valve in response to pressure entering said application pressure inlet to move said second piston valve away from said valve passage closing position to place said pressure chamber in communication with said outlet, said application piston assembly having exhaust passage means closed by said second piston valve when said second piston valve is in contact therewith, and a transfer passage in said housing communicating with said exhaust passage means and said exhaust outlet.

3. An emergency relay valve comprising a housing, an emergency pressure inlet in said housing, an application pressure inlet in said housing, a first chamber in communication with said emergency inlet, a second chamber in communication with said application inlet, a transfer passage between and communicating with said chambers, a first piston reciprocal in said first chamber between said emergency inlet and said transfer passage and positioned to be acted upon by pressure entering said emergency inlet, an axial passage in said first piston communicating with said emergency inlet and said transfer passage, yielding means positioned to urge said piston toward said emergency inlet, a pressure chamber positioned to receive pressure flowing through said emergency inlet and said passage in said first piston, a pressure outlet, a valve passage between said pressure chamber and said pressure outlet, a valve yieldingly urged toward position closing said valve passage, a piston assembly reciprocal in said application chamber and having portions movable against said valve to move said valve to open said valve passage in response to pressure entering said application chamber through said transfer passage and portions movable against said first-named portions to move said valve to open said valve passage in response to pressure entering said application chamber through said application inlet.

4. The structure of claim 3 characterized by and including an exhaust outlet in said housing, a valve yieldingly urged toward position closing said exhaust outlet, said valve being positioned for contact by said first named piston and movable into exhaust outlet open position to place said transfer passage in communication with said outlet in response to movement of said first named piston, and an exhaust passage in said application piston assembly in communication with said transfer passage and said outlet when said application piston assembly portion is away from said first named valve means.

5. In a fluid pressure brake system for vehicles and the like, a fluid pressure reservoir, a source of emergency fluid pressure, a source of brake application fluid pressure, and a plurality of brake chambers, the combination therewith of an emergency relay valve, said valve comprising a housing, an emergency chamber in communication with said emergency fluid pressure source, a pressure chamber in communication with said reservoir, an application chamber in communication with said application pressure source, a pressure outlet in communication with said brake chambers, and an exhaust outlet, an emergency piston reciprocal in said emergency chamber, a passage in said emergency piston, said passage communicating with said pressure chamber, a check valve in said passage effective to prevent passage of fluid pressure from said pressure chamber to said emergency fluid pressure inlet, an application valve controlling communication between said pressure chamber and said pressure outlet, an application piston reciprocal in said application chamber in response to delivery of application pressure thereto from said application pressure source, said application piston being effective to open said application valve in response to said application pressure, a transfer passage communicating with said emergency chamber and said application chamber, said application piston having a portion separately movable to open communication between said pressure chamber and said pressure outlet in response to emergency pressure entering said application chamber from said transfer passage, said passage in said emergency piston being positioned to deliver said emergency pressure to said transfer passage when said emergency piston is in a predetermined position in said emergency chamber, exhaust passage means in said application piston portion communicating with said transfer passage and open to said pressure outlet when pressure entering said application chamber from said outlet is greater than the pressure entering said application chamber from said application inlet, said transfer passage being in communication with said exhaust outlet when said emergency piston is at another position in said emergency chamber.

6. A relay valve having a first chamber, a first piston reciprocal in said chamber, a service pressure inlet communicating with said chamber to deliver pressure to one side of said first piston, an extension on the opposite side of said first piston, a second piston reciprocal in said chamber, an exhaust outlet communicating with said chamber between said pistons, said extension being in operating contact with one side of said second piston, a valve face on said opposite side of said second piston, a bore in said second piston extending through said valve face, a second chamber, a pressure outlet in said second chamber, a valve piston controlling communication of said second chamber with said first chamber, said valve face on said opposite side of said second piston being positioned to seat upon said valve piston to sever communication of said second chamber with said first chamber, yielding means urging said valve piston toward said valve face, an operating pressure inlet communicating with said second chamber, a second valve face controlling communication of said operating pressure inlet with said second chamber, said valve piston having a portion positioned to seat upon said second valve face to sever said last-named communication, said yielding means being positioned to urge said valve piston toward said second valve face, said valve piston having an aperture therein whereby pressure entering said second chamber from said operating pressure inlet is delivered to both sides of said valve piston.

7. In a relay valve, a housing, a first piston reciprocal in said housing, a service pressure inlet positioned in said housing to deliver pressure to one side of said first piston, spaced legs on the opposite side of said piston, a second piston reciprocal in said housing, said legs being positioned for operating contact with said second piston, an exhaust outlet in said housing, a fluid pressure outlet in said housing, an operating pressure inlet in said housing, a first valve face positioned to control communication between said operating pressure inlet and said pressure outlet, a second valve face positioned to control communication between said pressure outlet and said exhaust outlet, a valve piston carrying valve seat portions positioned for seating on said valve faces to control said communications and yielding means operative against said valve piston to urge said piston toward said valve faces, said valve piston having passages exposed to said pressure inlet when said valve piston seat portion is not seated on said first valve face whereby fluid pressure from said inlet is directed beneath said valve piston to urge the same toward said valve faces.

8. In an emergency relay valve, a housing, an emergency fluid pressure inlet in said housing, a reservoir pressure outlet in said housing, an application outlet in said housing, a first passage means interconnecting the emergency fluid pressure inlet and the application outlet, a second passage means in communication with the first passage means and connected to the reservoir pressure outlet to deliver fluid pressure thereto, a valve means, a transfer passage between said inlet and said application outlet, said valve means being disposed in the first passage means between the inlet and the application outlet and being responsive to a predetermined fluid pressure in said emergency inlet to connect said transfer passage to said application outlet for the exhaust of pressure therethrough and responsive to a pressure below said predetermined pressure to supply pressure to said application outlet through said first passage means.

9. The structure of claim 8 characterized by and including an exhaust outlet in said housing in communication with the first passage means, and a piston valve in the first passage means on the inlet side of the valve means, said piston valve being responsive to said predetermined fluid pressure through the inlet to close communication between said inlet and said valve means through said transfer passage and to open communication between said application outlet and said exhaust outlet through said transfer passage.

10. The structure of claim 8 characterized by and including an exhaust outlet in said housing in communication with the first passage means, and a piston valve in the first passage means on the inlet side of the valve means, said piston valve being responsive to said predetermined fluid pressure through the inlet to close communication between said inlet and said valve means through said transfer passage and to open communication between said application outlet and said exhaust outlet through said transfer passage, while maintaining said inlet in communication with said reservoir pressure outlet through said second passage means.

11. A relay emergency valve comprising a housing, an emergency pressure inlet in said housing, a reservoir outlet in said housing, a brake pressure outlet in said housing, an application pressure inlet in said housing, a first valve responsive to fluid pressure in the emergency inlet for controlling communication between said reservoir and brake pressure outlets, an exhaust outlet, a second valve controlling communication between said exhaust and brake pressure outlets, a first piston responsive to pressure entering said emergency inlet to move said second valve, a second piston responsive to pressure entering said application inlet to move said first valve, passage means through said first piston and said second valve, said passage means being effective, at a first position of said first piston, to deliver pressure from said emergency inlet simultaneously to said reservoir outlet and to the first valve to open the same to thereby interconnect the reservoir and the brake pressure outlet and at a second position of said first piston to close the first valve and interconnect the brake pressure outlet and the exhaust outlet.

12. The structure of claim 11 characterized by and including yielding means positioned to urge said first piston toward said first position in response to diminution of pressure entering said emergency pressure inlet.

References Cited in the file of this patent
UNITED STATES PATENTS

| | | |
|---|---|---|
| 2,441,050 | Wiegers | May 4, 1948 |
| 2,656,014 | Fites | Oct. 20, 1953 |
| 2,832,646 | Fites | Apr. 29, 1958 |
| 3,022,118 | Dobrikin | Feb. 20, 1962 |